United States Patent [19]
da Silva

[11] Patent Number: 6,148,417
[45] Date of Patent: Nov. 14, 2000

[54] METHOD FOR DETERMINING A SOURCE OF FAILURE DURING A FILE SYSTEM ACCESS

[75] Inventor: Luis A. da Silva, Santa Clara, Calif.

[73] Assignee: Micron Electronics, Inc., Nampa, Id.

[21] Appl. No.: 09/006,778

[22] Filed: Jan. 14, 1998

[51] Int. Cl.⁷ .................................................... G06F 11/30
[52] U.S. Cl. ................ 714/25; 714/15; 709/201
[58] Field of Search .............................. 714/5, 8, 29, 42, 714/59, 15, 25; 709/201

[56] References Cited

U.S. PATENT DOCUMENTS

| | | | |
|---|---|---|---|
| 5,564,011 | 10/1996 | Yammine et al. | 395/182.13 |
| 5,640,556 | 6/1997 | Tamura | 395/610 |
| 5,659,682 | 8/1997 | Devarakonda et al. | 395/184.01 |
| 5,909,542 | 6/1999 | Paquette et al. | 395/200.33 |

*Primary Examiner*—Ayaz R. Sheikh
*Assistant Examiner*—Jigar Pancholi

*Attorney, Agent, or Firm*—Park & Vaughn LLP

[57] ABSTRACT

One embodiment of the present invention provides a method for determining a source of failure during a failed file access in a computer system. This method generates a sequence of file references from a first location in the computer system, and maintains a record of parameters specifying the sequence of file references. The results of the sequence of file references are examined to detect a failure during a file reference. If a failure is detected, the failed file reference is reconstructed using the record of parameters, and is then retried to determine the source of failure. In between retries, the method allows various system components to be manipulated to isolate the source of failure. In one embodiment, these manipulations include: replacing hardware components; replacing system firmware; replacing software components; and inserting debug code into a program on the computer system. Another embodiment of the present invention transfers file reference parameters to a second location in the computer system, so that the failed file reference can be retried from the second location in order to isolate the source of the failure.

21 Claims, 6 Drawing Sheets

METHOD FOR DETERMINING A SOURCE OF FAILURE DURING A FILE SYSTEM ACCESS

BACKGROUND

1. Field of the Invention

This invention relates to methods for testing computer systems, and more particularly to a method and an apparatus for finding a source of failure during a file system access by retrying the failed file system access from different locations in a computer system.

2. Related Art

As computer systems grow increasingly more complex, it is becoming increasingly more difficult to isolate and identify the sources of some computer system failures. A distributed computing system is particularly prone to this type of problem because the distributed computing system typically spans numerous computers and file servers coupled together through a computer network. Consequently, failures can arise in any one of the interacting hardware, software and even firmware components of the distributed computing system. Hence, it is often difficult, if not impossible, to identify the source of an error by testing from a single location in the distributed system.

Distributed computing systems provide significant advantages for computer system users. Distributed computing systems typically include a distributed file system, which allows processors on different nodes of the system to access files on other nodes of the system. For example, workstations can often access files residing on remote file servers. Additionally, distributed computing systems often provide facilities to make these file accesses transparent, so that application programs and workstation users can access files on the file server in the same way that they access files on a local disk drive.

Although, distributed file systems provide significant advantages for computer system users, the process of designing, building and configuring a distributed file system can be very complicated. It is often very hard to identify the source of a failure in a distributed file system, because a design flaw or a component failure at many different locations in the distributed system may potentially cause the failure.

Existing diagnostic tools can often only detect the fact that a failure has occurred, not the source of a failure. These diagnostic tools typically generate a stream of file references that systematically test accesses to different storage media in the distributed system. During testing, errors in writing to or reading from a particular file are typically indicated on a display. However, the fact that a failure occurred during a particular file operation is often not enough to identify the source of the failure. For example, a failure in writing a test pattern to a location in a file and then reading the same pattern back again may be caused by a number of factors, including: (1) a failed network interface card, (2) a failed network driver, (3) a bad disk sector or (4) a failure in a computer system's memory. In order to isolate the source of a failure, additional tests must be performed, during which various system components may be swapped, modified or otherwise manipulated.

However, existing diagnostic tools do not facilitate this additional testing, because existing diagnostic tools do not provide facilities to retry a failure. It is typically necessary to rerun an entire test from the beginning to reproduce a failure. This process can take many hours, and possibly days. Consequently, reproducing the failures multiple times in order to locate the source of a failure can take a great deal of time.

Furthermore, in a large computer system, and especially in a distributed computing system, it may not be possible to locate the source of a failure by merely retrying the failure from a single location in the system. For example, it may be necessary to retry a failed file system access from both a workstation and a file server to determine that the failure is caused by a faulty network connection between the workstation and the file server.

Additionally, if an entire test must be rerun to retry a failure, it may not be possible to reproduce an error because system parameters can change over time. For example, the allocation of buffers to disk blocks in the computer system's disk cache will change over time. These changes can lead to different results for the same test sequence. Also, if the diagnostic tool generates randomized sequences of file references, these randomized sequences may be impossible to reproduce. Furthermore, intermittent errors may be impossible to detect if a great deal of time passes before a troublesome file access is retried. This is because atmospheric parameters, such as temperature, can change leading to different results for the same test sequence.

What is needed is a diagnostic tool for testing file references and detecting the source of a failure during a file reference, which allows a failure in a file reference to be immediately retried "on the fly." This would allow system components to be manipulated between retries to more rapidly determine the source of a failure.

Additionally, what is needed is a diagnostic tool for testing file references and detecting the source of a failed file reference, which allows a failure in a file reference to be retried from different locations within a computer system in order to isolate a source of failure.

SUMMARY

One embodiment of the present invention provides a method for determining a source of failure during a failed file access in a computer system. This method generates a sequence of file references from a first location in the computer system, and maintains a record of parameters specifying the sequence of file references. The results of the sequence of file references are examined to detect a failure during a file reference. If a failure is detected, the failed file reference is reconstructed using the record of parameters, and is then retried to determine the source of failure. In between retries, the method allows various system components to be manipulated to isolate the source of failure. In this embodiment, these manipulations include: replacing hardware components; replacing system firmware; replacing software components; and inserting debug code into a program on the computer system.

Another embodiment of the present invention transfers the record of file reference parameters to a second location in the computer system, so that the failed file reference can be retried from the second location in order to isolate the source of the failure. In a variation on this embodiment, the file reference parameters are transferred from the first location to the second location by saving the parameters to a file that is transferred to the second location.

In another embodiment of the present invention, the method includes initializing testing by receiving test parameters from a human user. In another embodiment, initializing testing includes scanning through the computer system to find data storage devices to be tested.

In another embodiment of the present invention, the file references are generated by a plurality of threads that are able to execute concurrently. In a variation on this embodiment, different threads generate file references for different storage devices, allowing the different storage devices to be tested at the same time.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Computing System

Figure 1:
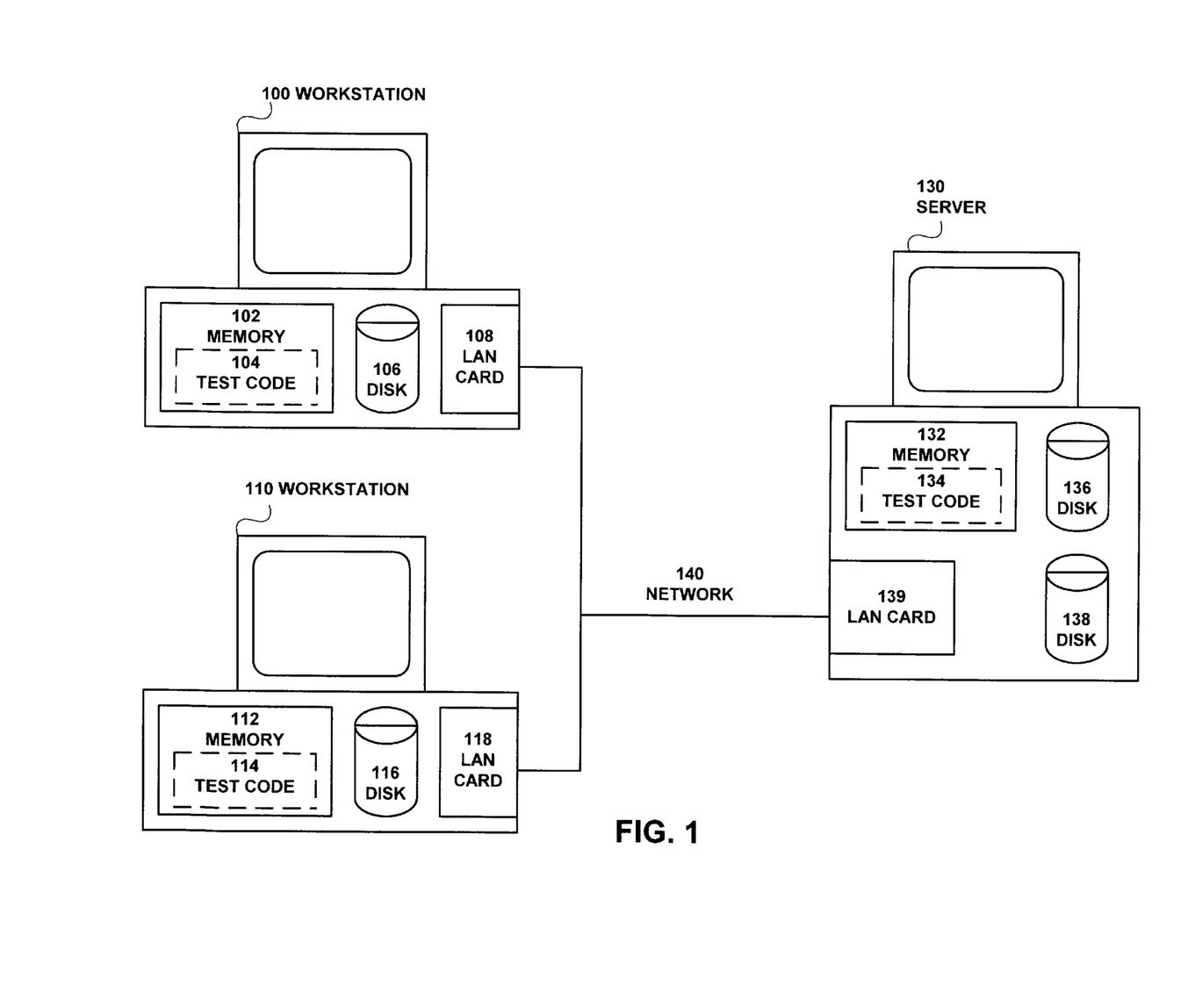
FIG. 1 is a block diagram illustrating an example of a distributed computing system upon which one embodiment of the present invention operates.

FIG. 1 is a block diagram illustrating a distributed computing system upon which one embodiment of the present invention operates. In this embodiment, a plurality of workstations, 100 and 110, are coupled through network 140 to server 130. In general, workstations 100 and 110 may be any type of computing node in a distributed computing system. This includes, but is not limited to, workstations, personal computers, mainframe computers, supercomputers and device controllers. Network 140 may be any type of communication network through which computers can communicate. This includes, but is not limited to, local area networks, such as Ethernet or Token ring networks, and wide area networks, such as the Internet. Server 130 may be any type of computational server capable of storing data that can be accessed by other computer systems over network 140.

In this embodiment, workstations 100 and 110 and server 130 include internal components, some of which are illustrated in FIG. 1. Workstation 100 includes local disk 106, local random access memory 102 and LAN card 108. Local random access memory 102 includes test code 104, which can be used to perform a series of test file system accesses that allows a failed access to be retried. Local LAN card 108 includes components to connect workstation 100 with network 140. Workstation 110 includes local disk 116, local random access memory 112 and local LAN card 118. Local random access memory 112 includes test code 114, which can be used to perform a series of test file system accesses, and allows a failed access to be retried. Local LAN card 118 includes components to connect workstation 100 with network 140. Server 130 includes local disk 136 and local random access memory 132. Local random access memory 132 includes test code 134, which can be used to perform a series of file system accesses, and allows a failed access to be retried. In this embodiment, server 130 additionally includes local area network (LAN) card 139, which includes components to connect server 130 with network 140. (Workstations 100 and 110 may also include LAN cards— but these are not shown). Server 130 also includes local disk 138 to store additional files. Server 130 may include additional disk drives, but these are not shown.

FIG. 1 illustrates a distributed computing system upon which one embodiment of the present invention operates. However, in general, the present invention may operate on a wide range of computing systems, and is not specifically limited to distributed computing systems. The present invention may also operate on mainframe computing systems, stand-alone computing systems, personal computer systems and even portable computer systems, such as laptop computers. In general the present invention can be used to test any computing system with a file system.

In the embodiment of the present invention, which operates on the computer system illustrated in FIG. 1, file accesses take place as follows. A file access originating from workstation 100 can be targeted to a file on local disk 106. This type of file access involves only local computing resources and components within workstation 100. Alternatively, workstation 100 can make a file access, such as a read or write operation, to a remote file located on server 130. For example, the file may be located on disk 136 on server 130. In this case, the file access proceeds across network 140, through LAN card 139 to disk 136. Along the way, various hardware and software components within workstation 100, network 140 and server 130 can potentially cause failures. Some distributed computing systems allow file accesses to other workstations. For example, workstation 100 may be able to access files on disk 116 within workstation 110 This embodiment also allows accesses to any or all disks in the system. For example, workstations 110 and 120 or server 130 can all access disks 106, 116 136 and 138 simultaneously.

In one embodiment of the present invention, test code, such as test code 104 in workstation 110, performs read and write accesses to files on various storage devices located on various workstations and file servers. In this embodiment, a test pattern is typically written to a particular location within a file located on a certain storage device. The location is subsequently read to ensure that the test pattern is read back properly from the file.

In the embodiment illustrated in FIG. 1, files are stored on disk drive devices. However, the invention can be applied to any type of device on which files can be stored. This includes, but is not limited to, tape storage devices, optical storage devices, floppy disks, RAM disks and floating gate storage devices.

Description of Testing System Architecture

Figure 2:
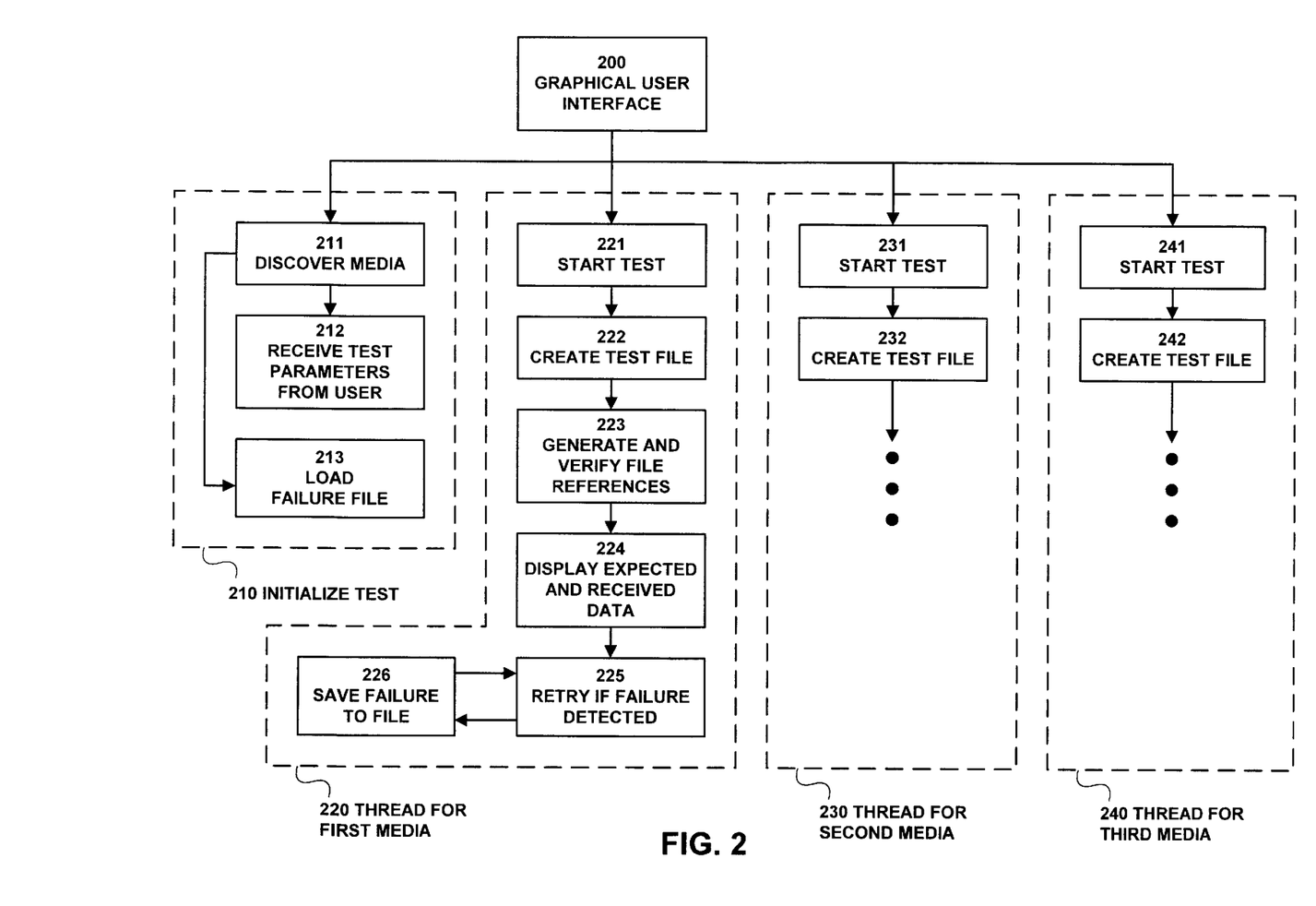
FIG. 2 presents flow charts of some of the activities initiated through graphical user interface 200 in order to test a file system in accordance with an embodiment of the present invention.

FIG. 2 is presents flow charts of some of the activities initiated through graphical user interface 200 in order to test a file system in accordance with an embodiment of the present invention. In one embodiment, these activities are performed by file system testing tools contained within test code, such as test code 104, 114 and 114, on workstations 100, 110 and server 130, respectively. In another embodiment, file system testing activities are accomplished through hardware and software resources distributed throughout a computer system to be tested.

In the embodiment illustrated in FIG. 2, file system testing is controlled through graphical user interface 200. In this embodiment, the first step in file system testing is to initialize the test 210. This involves discovering the different storage devices (or media) 211 on the computer system that require testing. This discovery process may involve scanning through the physical devices on the system, or otherwise scanning through the file system, in order to determine where files can be stored in the computer system. In this embodiment, the next step is to receive parameters 212 from a user of the testing system to define the scope of a particular test. These parameters may include, block size for test file references, numbers of iterations for certain tests, and test pattern types. Any other parameters relevant to testing may be gathered at this time. Alternatively, the user can load a file containing pre-recorded file test parameters 213.

In the embodiment illustrated in FIG. 2, once the initialization is complete, the test system creates and spawns off a plurality of independently executing threads, wherein each thread is dedicated to testing a particular storage device. In the illustrated embodiment, thread 220 is dedicated to testing a first media, thread 230 is dedicated to testing a second media and thread 240 is dedicated to testing a third media. This multi-threading can greatly improve performance, because the performance of file system testing is primarily limited by the slow speed of storage devices. Hence, a single processor is typically capable of testing a large number of storage devices concurrently. In another embodiment, file system testing is not multi-threaded, and storage devices are tested one at a time.

In the embodiment illustrated in FIG. 2, each thread performs a number of operations to test a particular media (or storage device). Referring to thread 220, testing begins in state 221, which is a start state for the testing. Thread 220 next proceeds to state 222. In state 222, a test file is created on the target storage device. Thread 220 next proceeds to state 223, in which a series of file references to the test file are generated; the results of the file references are then verified. As mention previously, in one embodiment the verification includes determining if a test pattern that is written to a file at a particular location can be read back properly from the particular location. Thread 220 next proceeds to state 224. In state 224, thread 220 displays expected and received data to a display. Thread 220 next proceeds to state 225. In state 225, if a failure was detected in a file access, the failure is retried in an attempt to isolate the cause of the failure. In the illustrated embodiment, the user can alternatively decide to proceed to state 226, in which parameters related to the failure are stored to a file. This file can be transferred to a second location in the computer system in order to retry a failed file system access from the second location in order to isolate the source of the failure. States 225 and 226 are described in more detail with reference to FIG. 5 below.

In the embodiment illustrated in FIG. 2, other threads perform the same series of actions for a different storage media. In particular, thread 230 performs the same actions in testing a second media, and thread 240 performs the same actions in testing a third media.

Figure 3:
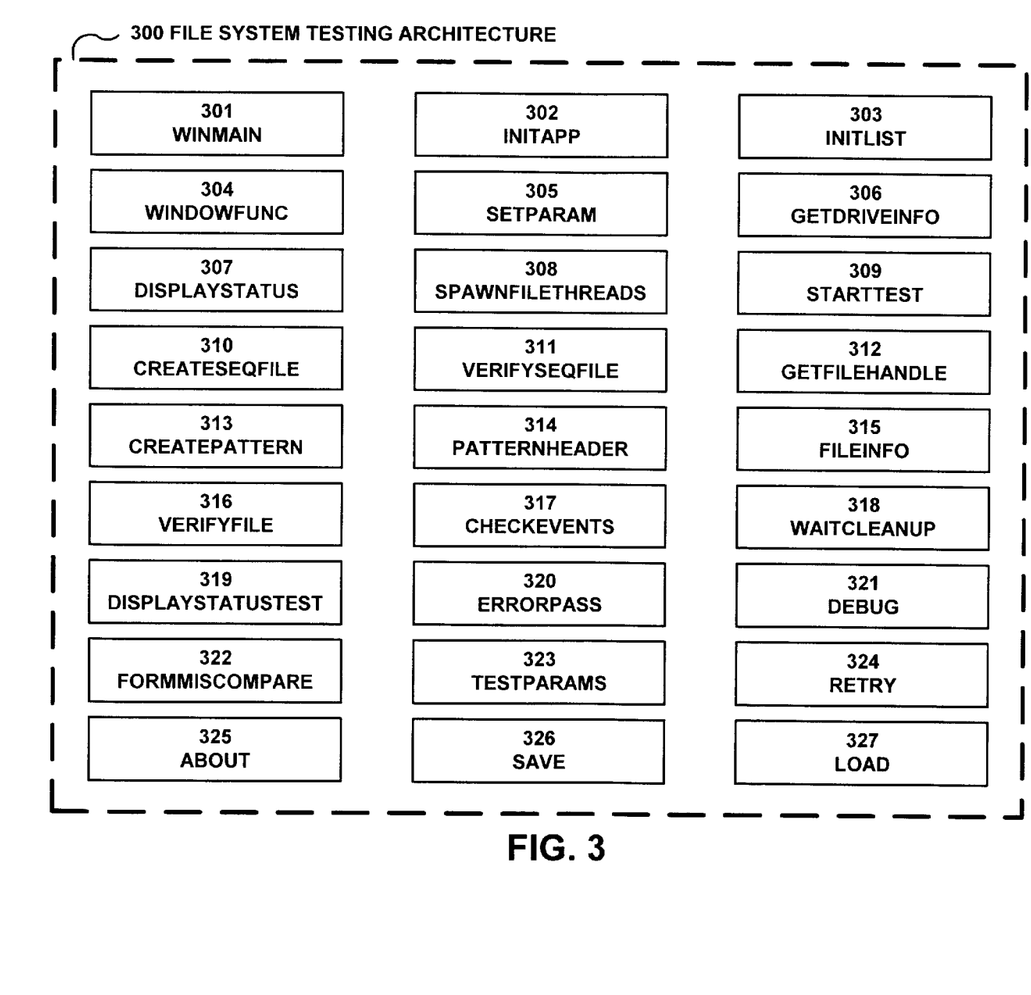
FIG. 3 is a diagram illustrating part of the software architecture for one embodiment of the present invention.

FIG. 3 is a diagram illustrating portions of the software architecture for one embodiment of the present invention. FIG. 3 illustrates a collection of functions, which are used by one embodiment of the present invention to perform the actions illustrated in FIG. 2. These functions collectively form part of file system testing architecture 300.

The functions operate as follows. Function WinMain 301 registers and displays a window class and process messages from the main message loop. Function WinMain 301 takes as input an instance handle, a previous handle and command line arguments and a Windows Tm display mode. It returns a FALSE value if there is a failure, or it returns a message when exiting. Function InitApp 302 initializes the window class and all resources and styles, it then registers the class. Function InitInst 303 initializes a window class as well as resources and styles, it then registers the class. Function WindowFunc 304 is called by Windows95™, and is passed messages from the message queue. Function SetParam 305 processes messages for the set parameter dialog box. Function GetDriveInfo 306 obtains a list of drives and share names. It returns a FALSE value if it was unable to populate the device linked list with the test objects that were discovered. Function DisplayStatus 307 processes messages for the main status dialog box. Function SpawnFileThreads 308 spawns individual threads for each of the test objects selected. Function StartTest 309 is the main testing function. It controls logic for reading, writing and verifying data to and from the target client. Function CreateSeqFile 310 calls all functions required to create a sequential test file, and calls an Error function if necessary. Function VerifySeqFile 311 calls all functions required to verify a sequential test file, and calls an Error function if necessary. Function GetFileHandle 312 opens a file with the proper read and write modes. Function CreatePattern 313 creates a test pattern for the test file references. Function PatternHeader 314 writes or reads a pattern header of a test file. Function FileInfo 315 reads or writes block and loop header information. Function VerifyFile 316 returns TRUE if a comparison is successful and returns FALSE if it is unable to read a file, or if a comparison fails. Function CheckEvents 317 checks for events from the Display Status dialog box, it returns FALSE if the exit button is depressed. Function WaitCleanUp 318 waits for a stop event to return to the calling process and displays data if the variable "display event" is set. Function DisplayTestStatus 319 displays status by displaying a field from a struct to a dialog window handle in the struct. Function ErrorPass 320 displays an error to the appropriate dialog boxes. Function Debug 321 displays the 8 bytes before and after a corrupted byte. This function is invoked either manually, from the Main Windows menu, or when a test in progress fails. Function FormMiscompare 322 displays the 32 bytes before and after a corrupted byte. Function TestParams 323 retrieves the test parameters from a failed pass from a file. Function Retry 324 allows the user to retry a filed read of a block. It also saves test parameters to file. Function About 325 processes messages for the "About" dialog box. Function Save 326 saves system parameters. Function Load 327 loads system parameters.

Description of Data Structure

Figure 4:
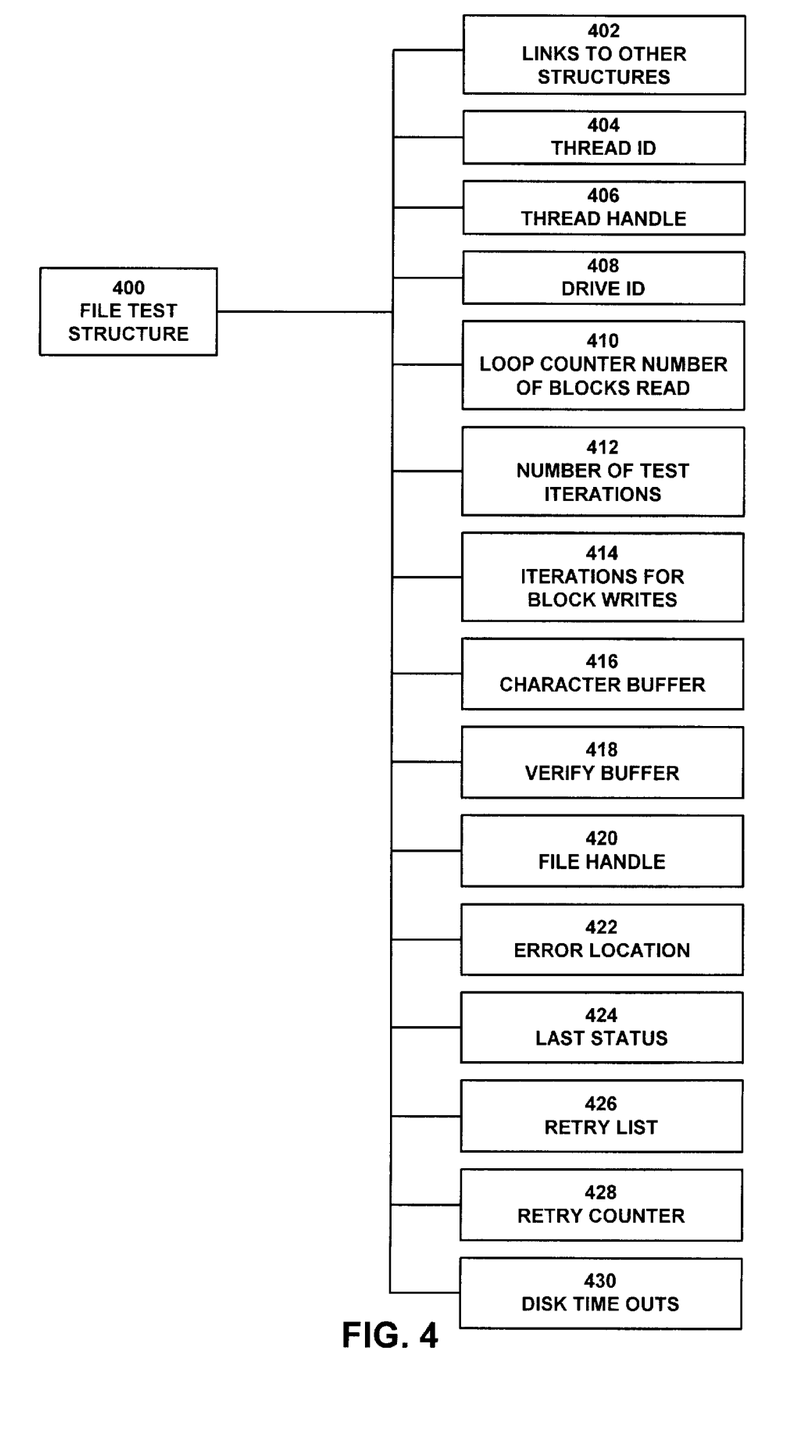
FIG. 4 is a diagram illustrating some components of a file test data structure, for storing parameters involved in generating test file references in accordance with an embodiment of the present invention.

FIG. 4 is a diagram illustrating some components of a file test data structure 400, for storing parameters involved in generating test file references in accordance with an embodiment of the present invention. File test data structure 400 is used during testing to keep track of the progress of the test. When a failure is detected during a file access, information from structure 400 is used to retry the failed file access operation, as is illustrated in states 225 and 226 of FIG. 2.

In one embodiment, file test data structure is implemented as a "struct" in the C programming language. In this embodiment, file test data structure 400 includes the following components. "Links to other structs" 402 contains a linkage, which is used to form a linked list of similar structures. In this embodiment, each struct in the linked list is associated with a particular thread, which is in turn associated with a test of a different storage device. Thread ID 404 contains an identifier for the thread associated with structure 400. Thread handle 406, contains a handle that is used to manipulate the thread. Drive ID 408 includes a character string representing the storage device to be tested using structure 400. "Loop counter number of blocks read" 410 contains a counter which keeps track of the progress of block reads during a test. "Number of test iterations" 412 stores the number of iterations for a test. "Iterations for block writes" 414 keeps track of the number of block writes to be performed during a test involving structure 400. Character buffer 416 stores a test pattern, which is written to a file during a test. Verify buffer 418 stores the results of a read operation from the test file. This result is compared with the original test pattern stored in character buffer 416 in order to determine if the block was written to the file and read back properly. File handle 420 includes a handle for accessing the file involved in the test. Error location 422 includes the location within the file of a failed file access. Last status 424 includes the last status of a test in progress. Retry list 426 includes a list of failed file system accesses to be retried. Retry counter 428 keeps track of the number of retries that have occurred during a test. "Disk time outs" 430 keeps track of the number of disk retries.

Description of Failure Isolation Methodology

Figure 5:
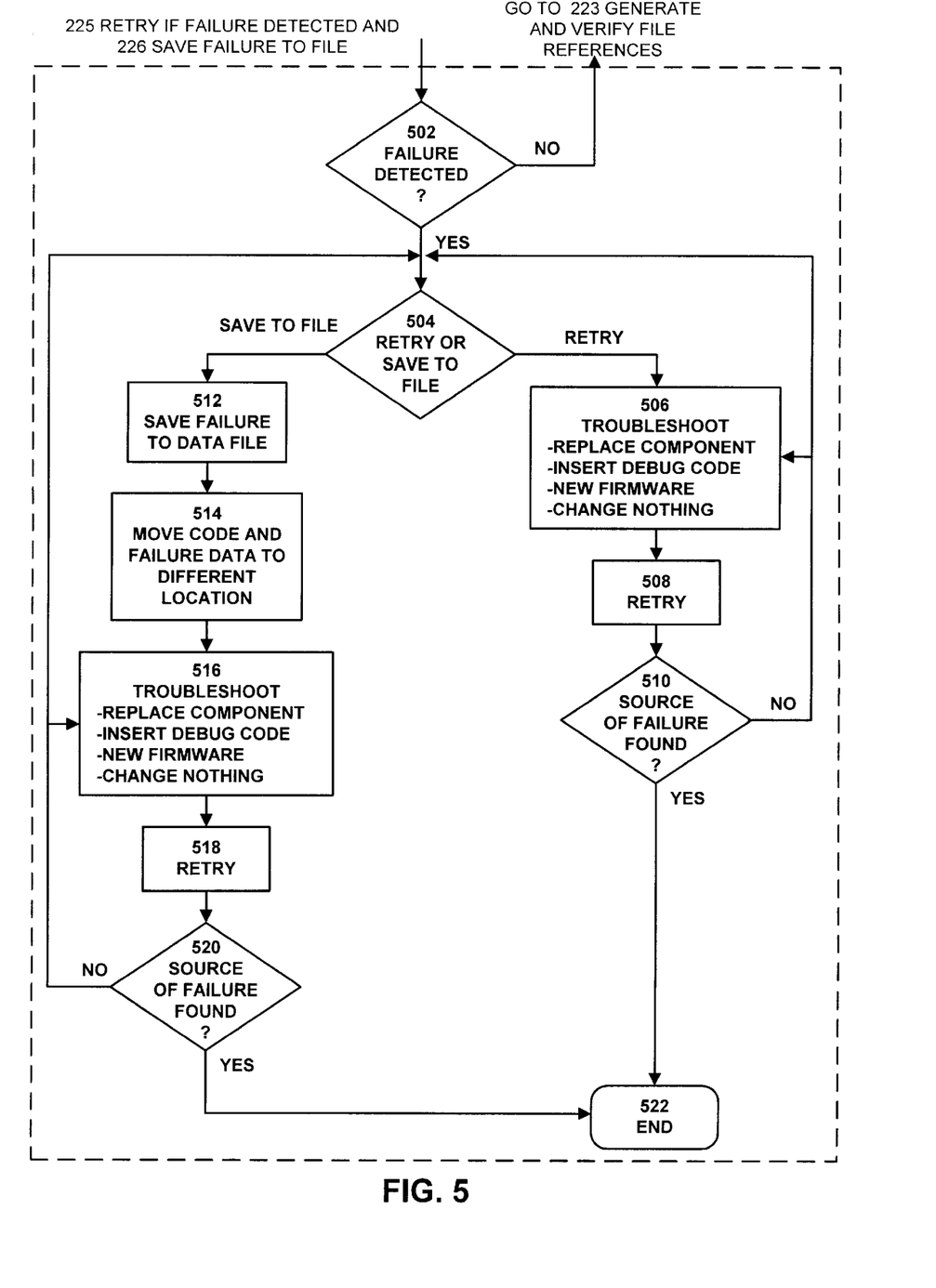
FIG. 5 is a flow chart illustrating some of the actions involved in determining a source of a failure in accordance with an embodiment of the present invention.

FIG. 5 is a flow chart illustrating some of the actions involved in determining the source of a failure in accordance with an embodiment of the present invention. FIG. 5 illustrates in more detail the actions involved in retrying a failure and storing a failure to a file in states 225 and 226 of FIG. 2, respectively, for one embodiment of the present invention. In this embodiment, the system first enters state 502 from state 224 in FIG. 2. In state 502, the system determines if a failure was detected. If not, the system returns to state 223 in FIG. 2 to continue generating and verifying file requests. If so, the system proceeds to state 504.

In state 504, the system determines whether to retry to failure, or to save the failure to a file. This can be determined by prompting a system user for a decision, or it can be determined automatically, based upon the type of error encountered or the type of testing taking place. If a retry is indicated, the system proceeds to state 506. If a file save is indicated, the system proceeds to state 512.

In state 506, the system performs trouble shooting to determine the source of the failure. In one embodiment, trouble shooting may include: replacing a hardware or software component of the computer system; inserting debug code into the computer system; inserting new firmware into the computer system; or changing nothing in the system. The system next proceeds to state 508.

In state 508, the system reconstructs and retries the file reference that caused the failure using parameters contained within structure 400 in FIG. 4. The system next proceeds to state 510. In state 510, the system determines whether or not the source of failure has been found. This may be determined by asking a human user, or it may be determined automatically based upon the type of trouble shooting taking place and the result of the retry. If the source of failure is found, the system proceeds to state 522, which is an end state. Otherwise, the system returns to state 504, or to state 506, to repeat the process as necessary to find the source of failure.

In state 512, a file save was indicated. Failure data from data structure 400, and possibly from additional sources, is encapsulated and saved to a file. The system then proceeds to state 514. In state 514, the failure data contained in the file is moved to a different location in the system in order to retry the filed file system access from the different location, to hopefully isolate the source of failure. The system then proceeds to state 516.

In state 516, the system performs trouble shooting to determine the source of the failure. In one embodiment, this trouble shooting may include: replacing a hardware or software component of the computer system; inserting debug code into the computer system; inserting new firmware into the computer system; or changing nothing in the system. The system next proceeds to state 518.

In state 518, the system reconstructs and retries the file reference that caused the failure using parameters contained within structure 400 in FIG. 4. The system next proceeds to state 520. In state 520, the system determines whether or not the source of failure has been found. This may be determined by asking a human user, or it may be determined automatically based upon the type of trouble shooting taking place and the result of the retry. If the source of failure is found, the system proceeds to state 522, which is an end state. Otherwise, the system returns to state 504, or to state 516, to repeat the process as necessary to find the source of failure.

Description of Example of Failure Isolation

Figure 6:
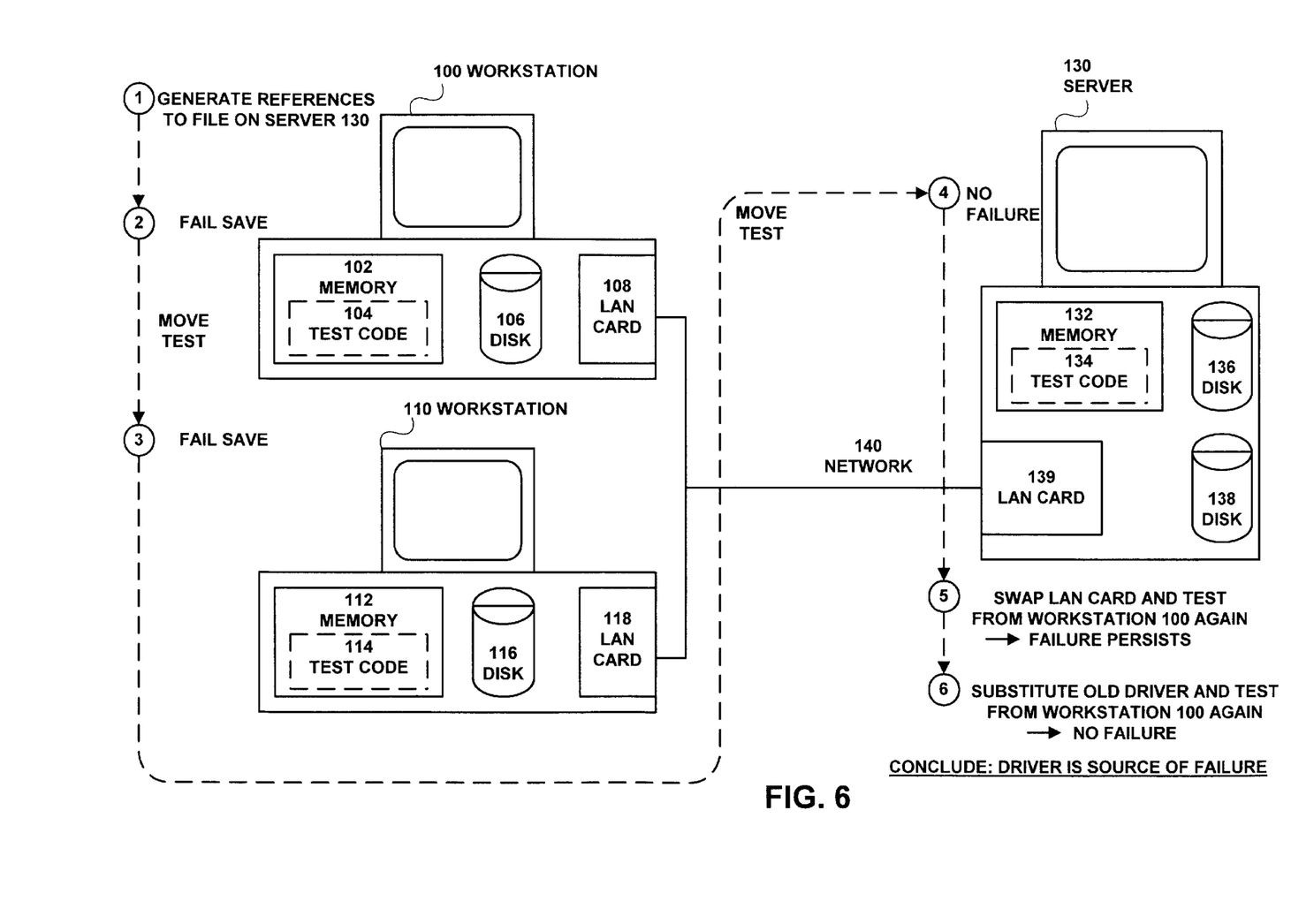
FIG. 6 illustrates an example in which the source of a failed file reference is isolated in accordance with an embodiment of the present invention.

FIG. 6 illustrates an example in which the source of a failed file reference is isolated in accordance with an embodiment of the present invention. In this example, the computer system is identical to the computer system disclosed in FIG. 1. (1) This example starts by generating references from workstation 100 to a file located on server 130. This corresponds to state 223 from FIG. 2. (2) Next, a failure is detected during a file reference, and the failure is saved to a file. This corresponds to state 512 in FIG. 5. Next, the saved file, and if necessary the test program, is moved to workstation 1 10, and the failed file reference is retried from workstation 110. This corresponds to state 158 in FIG. 5. (3) In this example, a failure similarly occurs when attempting the same file reference from workstation 110. Again, the failure is saved to a file so it can be retried from a different location. Next, the saved file, and if necessary the test program, is moved directly to server 130, and the failed file reference is retried from server 130. (4) This time a failure does not occur, which suggests that the failure arose during communications between the workstations and server 130. (5) Next, LAN card 139 is swapped with a different LAN card, and the failed file access is retried from workstation 100. This troubleshooting corresponds to state 516 in FIG. 5. In this example, the failure persists despite the replacement of LAN card 139. (6) Next, the driver for LAN card 139 is replaced with an older version of the driver, which is known to work properly, and the failed file access is again retried from workstation 100. This time the failure does not occur. This implies that the driver was the source of the failure. Hence, the failure has been identified.

As the above example illustrates, one embodiment of the present invention allows a failed file reference to be easily retried from a variety of locations in a distributed system. This makes it possible to rapidly locate the source of the failure.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A method for determining a source of data corruption in a computer system, comprising:
   generating a sequence of file references from a first location in the computer system;
   maintaining a record of the generated sequence of file references in a form that allows a file reference in the generated sequence of file references to be retried if necessary;
   examining results returned in response to the sequence of file references to detect a failed file reference; and
   if a failed file reference is detected,
   taking an action to correct the cause of the failed file reference, and
   using the record of the generated sequence of file references to retry only the failed file reference and no other reference from the generated sequence of file references in order to determine the source of data corruption.

2. The method of claim 1, wherein the failed file reference causes data corruption.

3. The method of claim 1, wherein the failed file reference includes a plurality of file references.

4. The method of claim 1, wherein maintaining a record of the generated sequence of file references includes updating a data structure containing the generated sequence of file references.

5. The method of claim 1, wherein retrying the failed file reference includes saving the record of the generated sequence of file references to a file.

6. The method of claim 1, wherein taking the action to correct the cause of the failed file reference includes replacing hardware components in the computer system to determine the source of failure.

7. The method of claim 1, wherein taking the action to correct the cause of the failed file reference includes replacing firmware in the computer system to determine the source of failure.

8. The method of claim 1, wherein taking the action to correct the cause of the failed file reference includes inserting debug code into a program running on the computer system to determine the source of failure.

9. The method of claim 1, wherein taking the action to correct the cause of the failed file reference includes replacing driver software on the computer system to determine the source of failure.

10. The method of claim 1, including before the generating of the sequence of file references, initializing testing by receiving test parameters from a human.

11. The method of claim 1, including before the generating of the sequence of file references, initializing testing by scanning through the computer system to find data storage devices to be tested.

12. The method of claim 1, wherein the generating of the sequence of file references is performed by a plurality threads that are able to execute concurrently.

13. The method of claim 12, wherein different threads in the plurality of threads generate file references for different storage devices, so that different storage devices can be tested at the same time.

14. A method for determining a source of data corruption in a computer system, comprising:
   generating a sequence of file references from a first location in the computer system;
   maintaining a record of the generated sequence of file references in a form that allows a file reference in the generated sequence of file references to be retried if necessary;
   examining results returned in response to the sequence of file references to detect a failed file reference; and
   if a failed file reference is detected,
   taking an action to correct the cause of the failed file reference, and
   retrying the failed file reference to determine the source of failure by transferring the failed file reference from the record of the generated sequence of file references to a second location in the computer system, and retrying only the failed file reference and no other references from the generated sequence of file references from the second location in the computer system.

15. The method of claim 14, wherein transferring the failed file reference to the second location in the computer system includes:
   saving the failed file reference from the record of the generated sequence of file references to a file; and
   transferring the file to the second location.

16. The method of claim 14, wherein transferring the failed file reference to the second location in the computer system includes transferring information regarding the type of failure detected to the second location.

17. The method of claim 14, wherein:
   the computer system is a distributed computer system;
   the first location includes a first workstation in the computer system; and
   the second location includes a second workstation in the computer system.

18. The method of claim 14, wherein the second location includes a file server in the computer system.

19. The method of claim 14, wherein:
   the computer system is a distributed computer system;
   the first location includes a first workstation in the computer system; and
   the second location includes a file server in the computer system.

20. A method for determining a source of data corruption in a computer system, comprising:
   generating a sequence of file references from a first location in the computer system using a plurality threads that are able to execute concurrently, so that different storage devices can be tested at the same time;
   maintaining a record of parameters specifying the generated sequence of file references in a form that allows a file reference in the generated sequence of file references to be retried if necessary, including updating a data structure containing the generated sequence of file references;
   examining results returned in response to the sequence of file references to detect a failed file reference; and
   if a failed file reference is detected,
   taking an action to correct the cause of the failed file reference, and
   retrying the failed file reference to determine the source of failure by transferring the failed file reference from the record of the generated sequence of file references to a second location in the computer system, and retrying only the failed file reference and no other references from the generated sequence of file references from the second location.

21. An apparatus for determining a source of data corruption in a computer system, comprising:

a reference generation mechanism coupled to the apparatus, for generating a sequence of file references from a first location in the computer system;

a recording mechanism coupled to the apparatus, for maintaining a record of the generated sequence of file references in a form that allows a file reference in the generated sequence of file references to be retried if necessary;

an examining mechanism coupled to the apparatus, for examining results returned in response to the sequence of file references to detect a failed file reference; and a failure retrying mechanism for retrying the failed file reference to determine the source of failure, the failure retrying mechanism being configured to take an action to correct the cause of the failed file reference, and to use the record of the generated sequence of file references to retry only the failed file reference and no other reference from the generated sequence of file references in order to determine the source of data corruption.

* * * * *